Figure 1A:
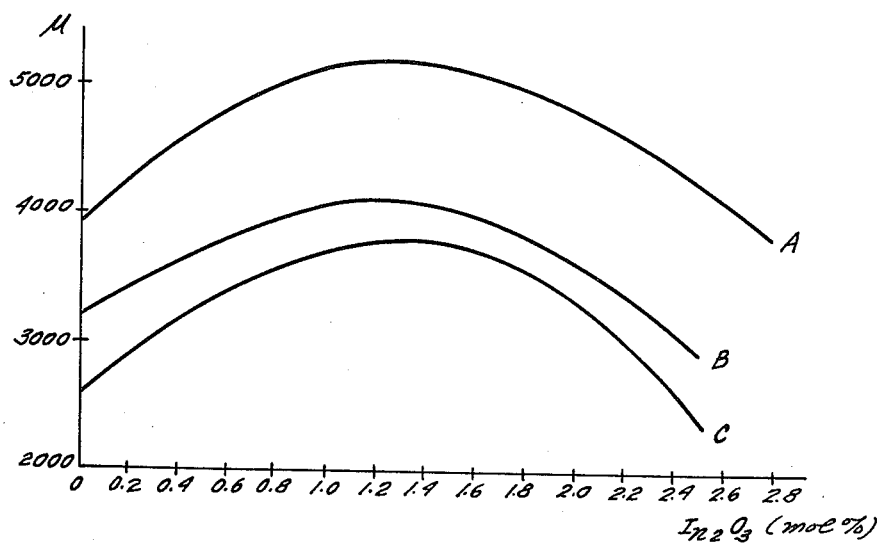

United States Patent Office 3,169,115
Patented Feb. 9, 1965

3,169,115
MANGANESE ZINC FERRITE CONTAINING VANADIUM PENTOXIDE, SILICON DIOXIDE, AND INDIUM TRIOXIDE
Tsuneo Akashi and Masao Tobita, Tokyo, Japan, assignors to Nippon Electric Company, Limited, Tokyo, Japan
Filed Aug. 22, 1961, Ser. No. 134,046
Claims priority, application Japan, Aug. 25, 1960, 35/36,167
2 Claims. (Cl. 252—62.5)

This invention relates to a method of manufacturing magnetic material and more particularly to a method of manufacturing magnetic material of the oxide magnetic type which is especially advantageous when utilized as a transformer core used in high frequency communication equipment.

It is well known that to obtain a MnZn ferrite composition having a high initial magnetic permeability $\mu$, care must be taken to use a very pure material. Compositions having maximum initial permeability $(\mu)$ of 5,000 have already been achieved. However, the losses at high frequency use of such a composition is extremely large, losses of more than $5 \times 10^{-5}$ $1/\mu.Q$ at 100 kc. having been measured. Therefore, it is extremely difficult to improve the loss characteristics of such material without decreasing the initial permeability, and usually the maximum value of initial permeability $(\mu)$ of MnZn ferrite was limited up to 3,500 in order to maintain an allowable loss characteristic. Therefore, even the known MnZn ferrites having a high initial permeability $(\mu)$ could not satisfy the severe requirements which must be met in miniaturization of electronic equipment. Equipment of this type must meet many critical requirements such as insertion loss, return loss, distortion, and other electrical properties over a wide operating range, and at the same time it must be as small in size as possible. To satisfy these requirements, a magnetic material of high initial permeability and of very low loss is greatly desirable.

This invention provides a new oxide magnetic material and a method for producing a material having characteristics satisfying the above mentioned requirements. An oxide magnetic material thus prepared enables the miniaturizing of transformer cores to half the size of prior art cores having the same operating characteristics.

It has been discovered that by adding indium trioxide, vanadium pentaoxide, and a very small amount of silicon oxide to a magnetic material of high purity, the initial permeability is substantially increased without any accompanying increase in losses which is unavoidable when using high purity material as a magnetic element. At least two of these added oxide compounds must be taken from each of the three groups of compounds, thus making it possible to obtain a MnZn ferrite having a high initial permeability, low loss characteristics by its coexistence effect.

It is therefore a primary object of this invention to provide a ferromagnetic composition having a substantially high permeability $(\mu)$.

Another object of this invention is to provide a ferromagnetic material having a substantially high permeability $(\mu)$ and an accompanying low loss ratio $(Q)$.

Another object of this invention is to provide a ferromagnetic composition having high permeability $(\mu)$ and low loss ratio Q which includes the addition of silicon dioxide.

Another object of this invention is to provide a ferromagnetic composition having high permeability $(\mu)$ and low loss ratio of Q which includes the addition of vanadium pentoxide.

Another object of this invention is to provide a ferromagnetic composition having high permeability $(\mu)$ and low loss ratio Q which includes the addition of indium trioxide.

Another object of this invention is to provide a ferromagnetic composition having high permeability $(\mu)$ and low loss ratio Q which includes the addition of silicon dioxide and vanadium pentoxide.

Another object of this invention is to provide a ferromagnetic composition having high permeability $(\mu)$ and low loss ratio Q which includes the addition of silicon dioxide and indium trioxide.

Another object of this invention is to provide a ferromagnetic composition having high permeability $(\mu)$ and low loss ratio Q which includes the addition of vanadium pentoxide and indium trioxide.

These and other objects of this invention will become apparent in the following description and drawings in which: the graphic figures illustrate the characteristic curves of each examples by which the embodiments of this invention are shown;

FIGURES 1(a) and (b) show characteristics of permeability $\mu$ and $1/\mu.Q$ as the function of added amounts of indium trioxide to three basic compositions A, B and C, each consisting of MnZn ferrite system which contains 0.01 mol percent silicon oxide.

Figure 2A:
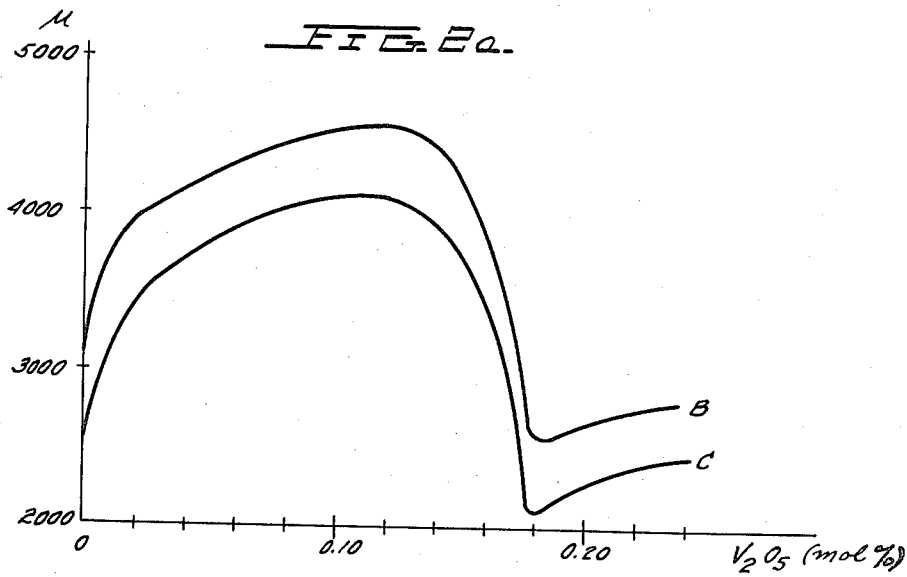

FIGURES 2(a) and (b) show characteristics of $\mu$ and $1/\mu.Q$ as the function of added amounts of vanadium pentaoxide to two basic compositions B and C, each consisting of MnZn ferrite system which contains 0.01 mol percent of silicon oxide.

Figure 3A:
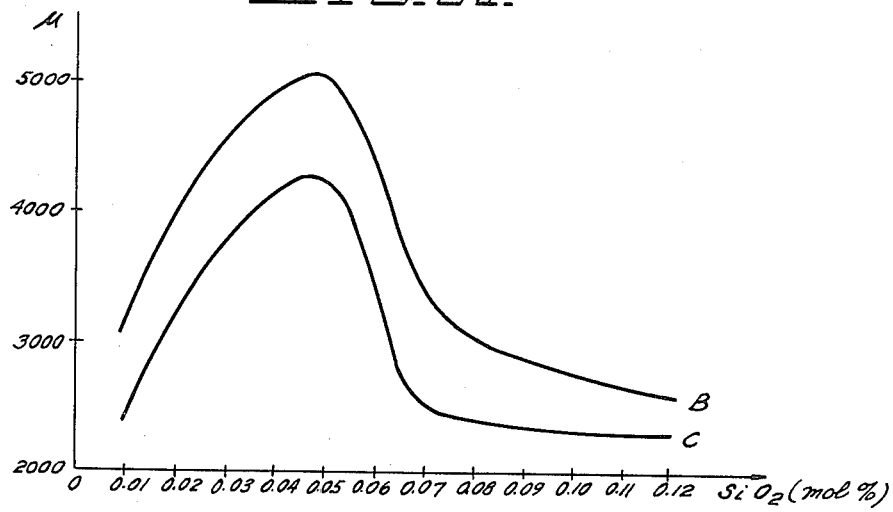

FIGURES 3(a) and (b) show characteristics of $\mu$ and $1/\mu.Q$ as the function of added amounts of silicon oxide to two basic compositions B and C, each consisting of MnZn ferrite system.

Figure 4A:
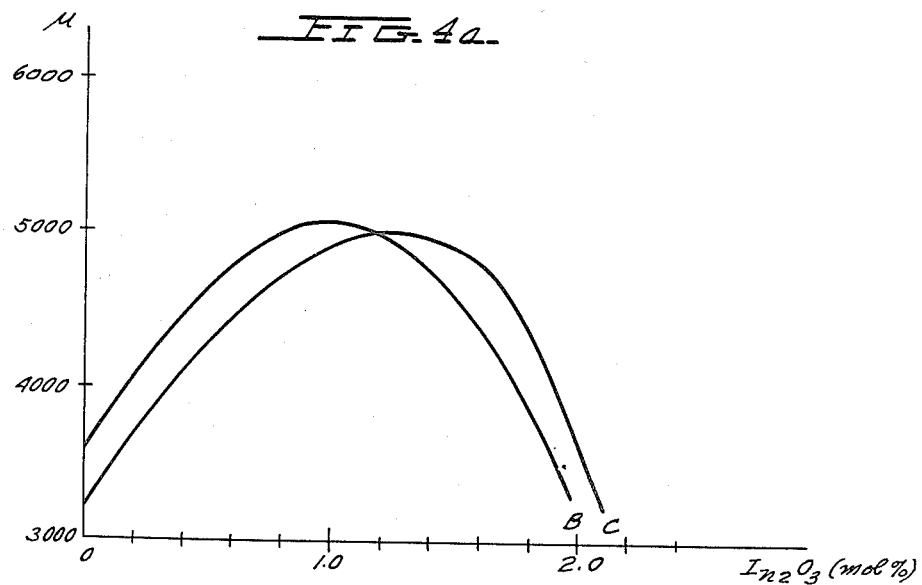
Figure 4B:
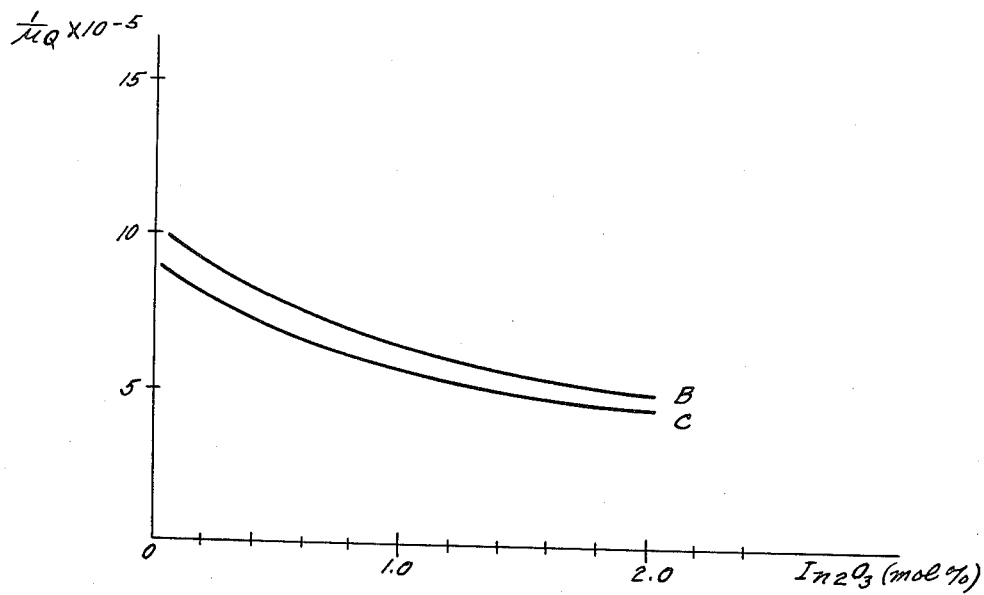

FIGURES 4(a) and (b) show characteristics of $\mu$ and $1/\mu.Q$ as the function of added amounts of indium trioxide to two basic compositions of B and C, each consisting of MnZn ferrite system which contains 0.12 mol percent of vanadium pentaoxide and 0.01 mol percent of silicon oxide.

Figure 5A:
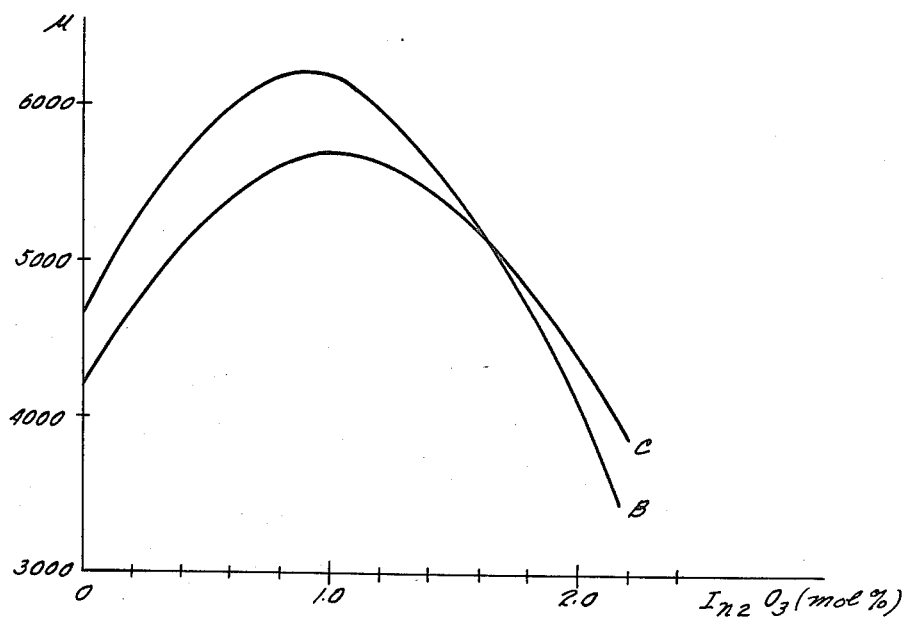
Figure 5B:
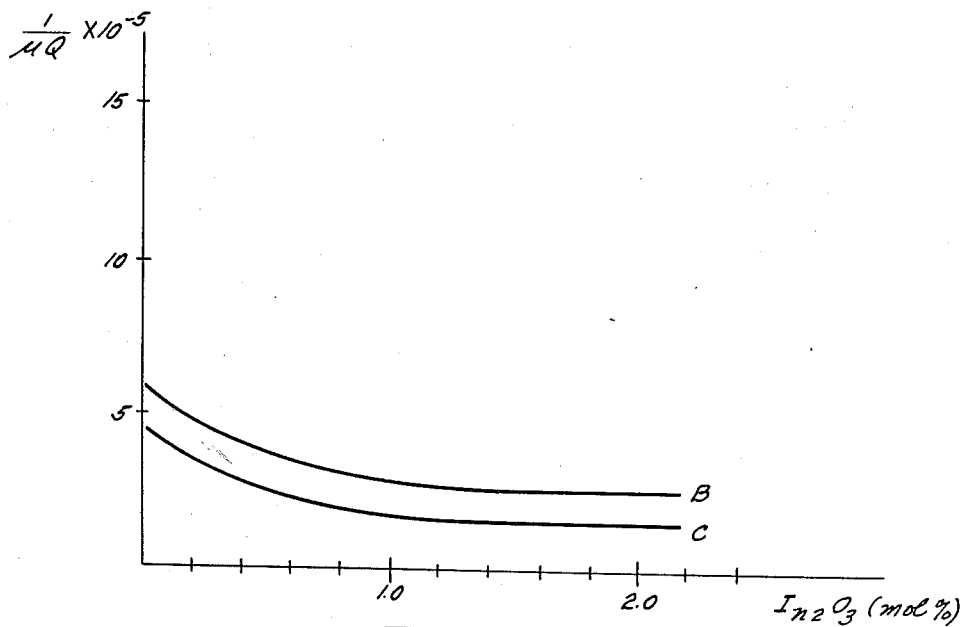

FIGURES 5(a) and (b) show characteristics of $\mu$ and $1/\mu.Q$ as the function of added amounts of indium trioxide to two basic compositions B and C, each consisting of MnZn ferrite which contain 0.12 mol percent of vanadium pentaoxide and 0.024 mol percent of silicon oxide.

Figure 6A:
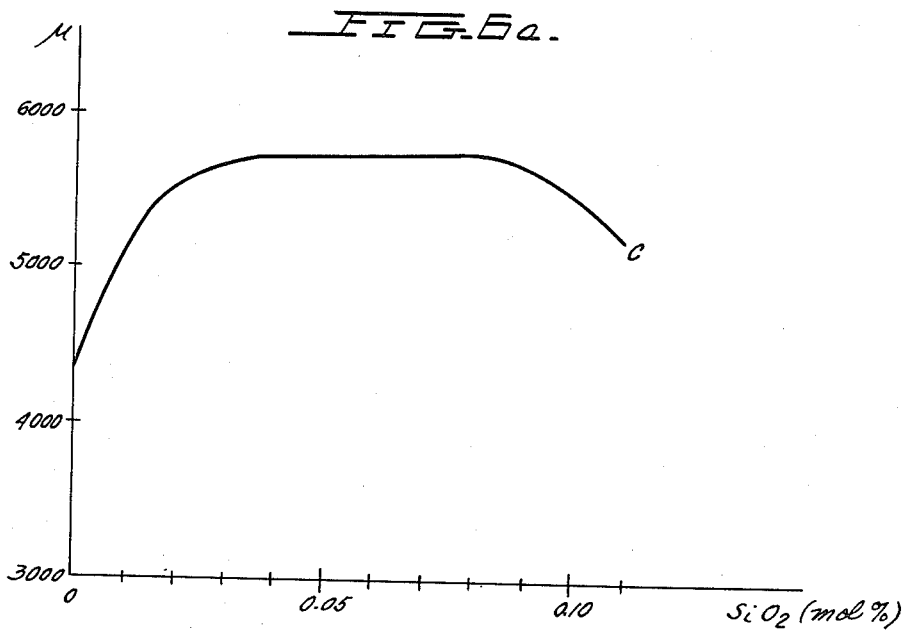
Figure 6B:
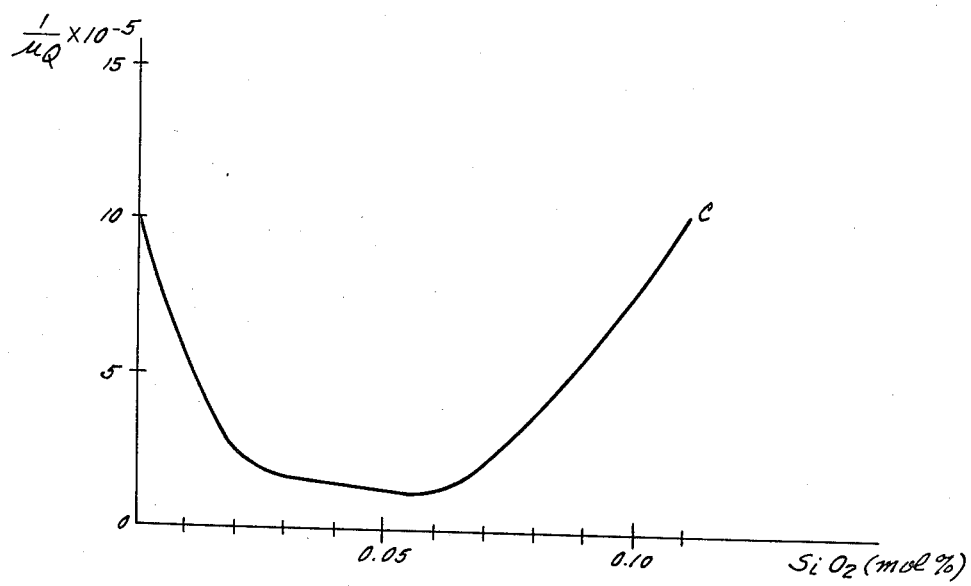

FIGURES 6(a) and (b) show characteristics of $\mu$ and $1/\mu.Q$ as the function of added amounts of silicon oxide to a basic composition C, consisting of MnZn ferrite system which contain 0.12 mol percent of vanadium pentaoxide and 1.2 mol percent of indium trioxide.

Prior art operations and devices with which the present application is concerned are described, for instance, in the prior art publications list below:

(1) Jap. Pat. Pub. No. 7,028/59
   Applicant: Centre National de la Recherche Scientifique
   Inventor: Charles Louis Guillaud
   (Filed in France October 29, 1956).
   Title: High Initial Magnetic Permeability (2) P.I.E.E., Part B, vol. 104, 165 (1957)
   Title: The Properties of Manganese-Zinc Ferrites and the Physical Processes Governing Them
   Author: C. Guillard, Ph. D.

To simplify the description of the present invention, it is assumed that all operations and operating elements of such known systems are to be considered part of the present disclosure, except for the modifications and features of the present invention as hereinafter described.

The effect of adding the compounds (to be more fully described) to the MnZn ferrite will be undersood by the fact that; without adding the compounds, MnZn ferrite has the characteristics of $\mu_1=2,500$, $1/\mu_1.Q_1=19.5\times10^{-5}$ at a frequency of 100 kc. MnZn ferrite is amazingly improved to the characteristics of $\mu_2=5,800$, $$1/\mu_2.Q_2=1.8\times10^{-5}$$

by adding a proper amount of indium trioxide, vanadium pentaoxide and silicon oxide. As is evident from the results, $\mu_2=2.3\mu_1$ while $$1/\mu_1.Q_1=0.09\frac{1}{\mu_2}Q_2$$

A more complete understanding of the invention may be obtained by reference to the following examples; the basic composition A is: 52.5 mol percent of $Fe_2O_3$, 25 mol percent of MnO, 22.5 mol percent of ZnO, the basic composition B is: 52.7 mol percent of $Fe_2O_3$, 27 mol percent of MnO, 20.3 mol percent of ZnO, the basic composition C is: 53.0 mol percent of $Fe_2O_3$, 30 mol percent of MnO, 17 mol percent of ZnO.

The method of preparing the material is: the materials containing less than 0.01 weight percent of impurities are weighed to make a definite mol proportion and co-mingled in a steel ball mill. The additive compounds may be admixed in the direct oxide form or in the form of salt which is converted to oxide by baking. The compounds may be added at anytime if it is done before the final baking process. Co-mingled materials are then calcined, compressed and baked during four hours at a temperature of 1,280° C. under nitrogen circumstance.

All $\mu$ and $1/\mu.Q$ values in the following examples were measured at a frequency of 100 kilocycles.

FIGURES 1(a) and (b) show the effect on the values $\mu$ and $1/\mu.Q$ by the successive addition of indium trioxide to the basic compositions A, B and C each containing 0.01 mol percent of silicon oxide.

As seen in the plotted curves, $\mu$ gradually increases, $\mu$ and $1/\mu Q$ of basic composition A becomes $\mu=5,200$ at its peak and $1/\mu Q=8.5\times10^{-5}$ when 1.2 mol percent of indium trioxide is added. By adding 1.2 mol percent of indium trioxide to the basic composition B, $\mu=4,100$, $1/\mu.Q=10\times10^{-5}$, as for composition C, $\mu=3,800$, $1/\mu.Q\doteq13\times10^{-5}$.

After reaching the maximum point, $\mu$ gradually decreases as the amount of added compound increases, and for the basic composition A, $\mu$ returns to the value that no compound is added with the addition of 2.85 mol percent of indium trioxide, where $1/\mu.Q=4.5\times10^{-5}$. For basic compositions B and C $\mu$s' return to their initial values with the addition of about 2.5 mol percent of indium trioxide, where $1/\mu.Q\doteq5\times10^{-5}$ for B and $$1/\mu.Q\doteq5.5\times10^{-5}$$

for C.

Figure 1B:
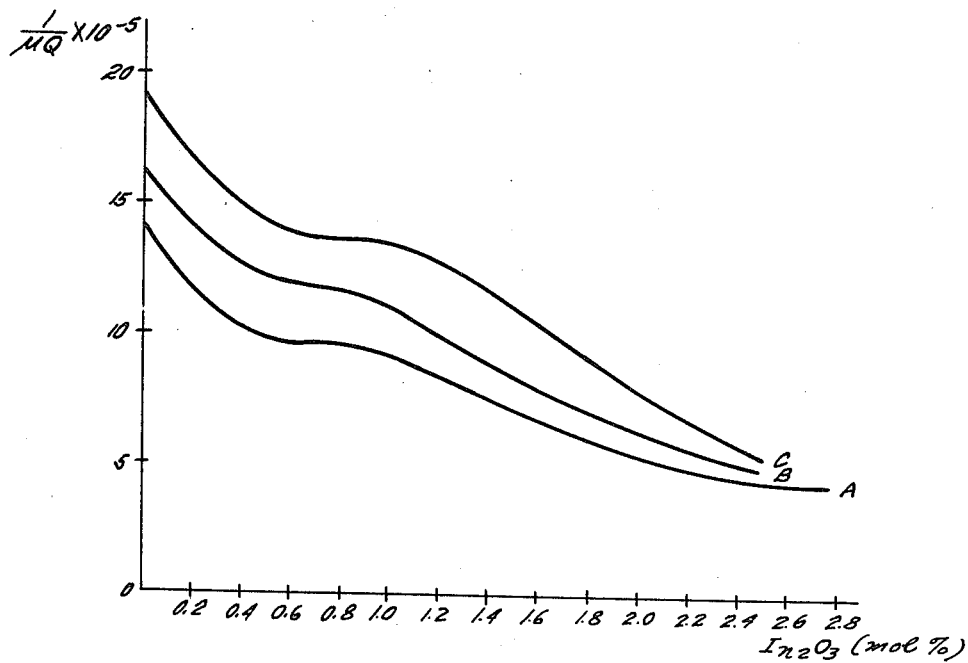

As can be seen from the results of FIGURES 1(a) and 1(b) (above examples), indium trioxide which is added in the range of between 0.05 and 2.8 mol percent greatly increases the value of $\mu$ and concurrently reduces the value of $1/\mu.Q$ in comparison with that of a ferrite composition containing no indium trioxide.

FIGURES 2(a) and (b) indicate the effect on $\mu$ and $1/\mu.Q$ by the addition of vanadium pentoxide to the basic compositions B and C which contain 0.01 mol percent of silicon oxide. $\mu$ increases as the additional amount of vanadium pentoxide increases, and reaches the maximum point of $\mu\doteq4,600$ and $\mu\doteq4,150$, respectively. After reaching maximum point, $\mu$ decreases rapidly as the amount of addition increases and achieves the minimum point with the addition of 0.18 mol percent of vanadium pentoxide. Subsequently $\mu$ rises again slightly by further addition. $1/\mu.Q$ decreases rapidly as the addition of vanadium pentoxide increases until at 0.02 mol, it slowly reaches the minimum point with 0.12 mol percent addition. It reaches $1/\mu.Q\doteq7\times10^{-5}$ for the basic composition B and $1/\mu.Q\doteq7.5\times10^{-5}$ for the composition C as shown in FIGURES 2(a) and (b). Further addition of vanadium pentoxide increases $1/\mu Q$ rapidly until $1/\mu Q$ reaches its initial value with the 0.18 mol percent addition.

It is also clear that the addition of a certain amount of vanadium pentoxide in the range of from 0.005 to 0.17 mol percent to a ferrite increases $\mu$ and decreases $1/\mu Q$ in comparison with that of a ferrite to which no vanadium pentoxide is added.

FIGURES 3(a) and (b) show the effect on $\mu$ and $1/\mu.Q$ by the addition of silicon oxide to the basic compositions B and C. As seen in the curve, $\mu$ increases gradually, $1/\mu Q$ decreases gradually, and reach their maximum and minimum point of $\mu=5,100$ and $$1/\mu.Q\doteq5.5\times10^{-5}$$

respectively for the basic composition B, and $\mu\doteq4,300$ and $1/\mu.Q\doteq6\times10^{-5}$ respectively for the composition C, by the addition of 0.048 mol percent of silicon oxide. Thereafter $\mu$ decreases and $1/\mu.Q$ increases to the maximum value of $1/\mu.Q=11\times10^{-5}$ as for basic composition B, $1/\mu.Q=13\times10^{-5}$ as for composition C with the addition of about 0.072 mol percent of silicon oxide.

As seen in this example, the addition of a proper amount of silicon oxide alone causes a relatively large decrease in $1/\mu.Q$ and increase in $\mu$.

Figure 2B:
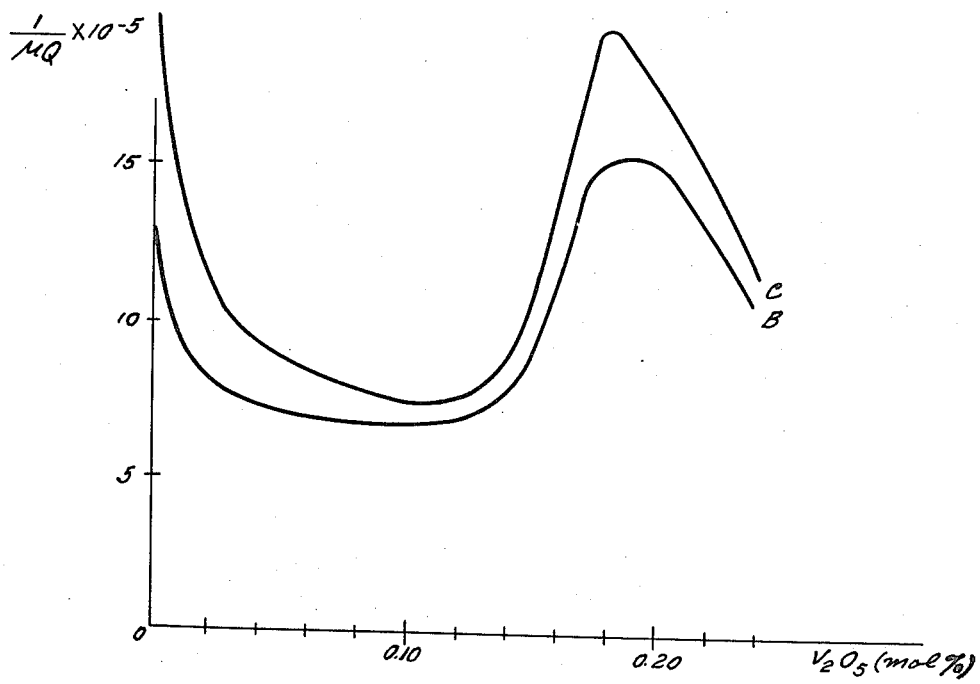
Figure 3B:
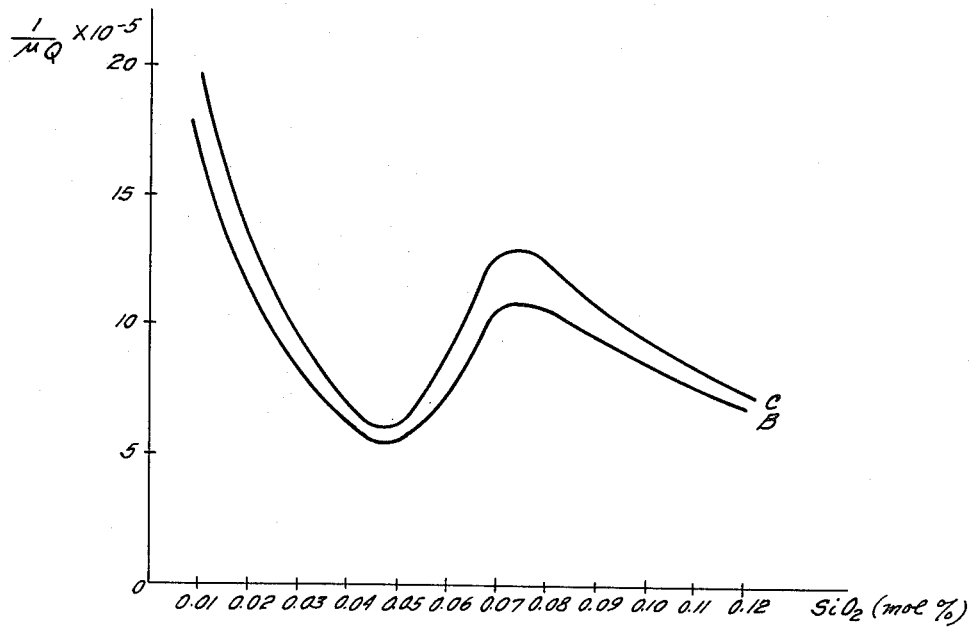

FIGURES 4(a) and (b) show an example of the effect of adding two or more of the compounds which were previously shown from FIGURE 1 to FIGURE 3. Additional amounts of indium trioxide have been added in addition to 0.12 mol percent of vanadium pentoxide and 0.01 mol percent of silicon oxide. $\mu$ increases to the maximum value and $1/\mu.Q$ decreases gradually. As for basic composition B, $\mu=5,100$, $1/\mu.Q\doteq7\times10^{-5}$ with the addition of about 0.9 mol percent indium trioxide; as for basic composition C, with the addition of about 1.2 mol percent indium trioxide, $\mu=5,000$, $1/\mu.Q\doteq5.5\times10^{-5}$. After reaching a maximum value $\mu$ decreases as the amount of impurity added increases.

For basic composition B $\mu$ returns the value that indium trioxide is not added with the addition of about 1.9 mol percent of indium trioxide, where the value $$1/\mu.Q=5\times10^{-5}$$

For composition C $\mu$ also returns the value that indium trioxide is not added with the addition of about 2.1 mol percent where $1/\mu.Q=4.5\times10^{-5}$. From these results, it is evident that the magnetic properties of $\mu$ and $1/\mu.Q$ is greatly improved by the multiple action of coexisting indium trioxide, vanadium pentoxide and silicon oxide.

FIGURES 5(a) and (b) show the effect of indium trioxide on $\mu$ and $1/\mu Q$ when 0.024 mol percent of silicon oxide and 0.12 mol percent of vanadium pentoxide are added to basic compositions B and C.

$\mu$ increases and $1/\mu.Q$ decreases gradually and for basic composition B $\mu$ reaches its maximum $\mu=6,300$, with the addition of about 0.9 mol percent of indium trioxide, where $1/\mu.Q=3\times10^{-5}$ and as for the compostion C, $\mu=5,700$, with the addition of about 1.0 mol percent of indium trioxide where $1/\mu Q=1.8\times10^{-5}$. After passing the maximum point, $\mu$ decreases as the amount of addition increases, with basic composition B returning to the value that indium trioxide is not added with the 1.8 mol percent addition, where $1/\mu Q=2.5\times10^{-5}$ and with composition C $\mu$ returning to the value that indium trioxide is not added, with 2.1 mol percent addition, where $$1/\mu.Q\doteq1.5\times10^{-5}$$

As is apparent from this data that addition of a proper amount of silicon oxide, indium trioxide and vanadium pentoxide improved the magnetic properties of ferrite by the combined presence of these three compounds.

FIGURES 6(a) and (b) represent the change of $\mu$ and $1/\mu.Q$ when the silicon oxide is added to basic composition C along with the presence of indium trioxide and vanadium pentoxide. Addition of proper amount of silicon oxide to composition C containing 1.2 mol percent of indium trioxide and 0.12 mol percent of vanadium pentoxide increases the value of $\mu$ abruptly.

With the addition of about 0.025 mol percent silicon oxide to basic composition C, $\mu$ reaches its maximum $\mu=5,700$, continuing to the point 0.08 mol percent addition, then decreases with further addition. $1/\mu.Q$ reaches the minimum value of $1/\mu.Q=1.2\times10^{-5}$ with the 0.06 mol percent addition of silicon oxide, decreasing after that with more addition of impurity. At the addition of about 0.11 mol of silicon oxide, $1/\mu.Q=10\times10^{-5}$.

As seen in this curve, the addition of silicon oxide from 0.005 to 0.11 mol percent greatly improves the magnetic properties. According to this invention, it is possible to obtain an oxide magnetic material having a high initial permeability and low loss quite easily, and it is especially adapted for use as a transformer core of high frequency range communication equipments of around 100 kc.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appended claims.

What is claimed is:

1. A magnetic oxide material consisting essentially of a manganese zinc ferrite composition containing from 52.5 to 53.0 mol percent ferric oxide, from 25 to 30 mol percent manganese oxide and from 17 to 22.5 mol percent zinc oxide, having incorporated therein at least two oxide additives selected from the group consisting of from 0.005 to 0.17 mol percent vanadium pentoxide, from 0.005 to 0.11 mol percent silicon dioxide, and from 0.05 to 2.8 mol percent indium trioxide.

2. A magnetic oxide material consisting essentially of a manganese zinc ferrite composition containing from 52.5 to 53.0 mol percent ferric oxide, from 25 to 30 mol percent manganese oxide and from 17 to 22.5 mol percent zinc oxide, having incorporated therein the oxide additives of vanadium pentoxide in the range of 0.005 to 0.17 mol percent, silicon dioxide in the range of 0.005 to 0.11 mol percent, and indium trioxide in the range of 0.05 to 2.8 mol percent.

References Cited in the file of this patent
UNITED STATES PATENTS

| | | |
|---|---|---|
| 2,579,267 | Leverenz et al. | Dec. 18, 1951 |
| 2,744,873 | Piekarski | May 8, 1956 |

FOREIGN PATENTS

| | | |
|---|---|---|
| 683,722 | Great Britain | Dec. 3, 1952 |

OTHER REFERENCES

Maxwell et al.: Magnetic and Crystalline Behaviour, etc., Physical Review, vol. 96, No. 6, December 15, 1954, pages 1501–1502.

Brailsford: Magnetic Materials, John Wiley and Sons, Inc., New York, 1960, pages 168–173.